United States Patent
Jin et al.

(10) Patent No.: US 12,027,919 B2
(45) Date of Patent: Jul. 2, 2024

(54) ROTOR MAGNET RETAINER

(71) Applicant: Black & Decker Inc., New Britain, CT (US)

(72) Inventors: Ming Jin, Suzhou (CN); Weifeng Qian, Suzhou (CN); Changxing Lu, Suzhou (CN); Tong Zheng, Suzhou (CN); Fulong Liu, Suzhou (CN); Yeli Gu, Suzhou (CN)

(73) Assignee: Black & Decker Inc., New Britain, CT (US)

( * ) Notice: Subject to any disclaimer, the term of this patent is extended or adjusted under 35 U.S.C. 154(b) by 185 days.

(21) Appl. No.: 17/577,644

(22) Filed: Jan. 18, 2022

(65) Prior Publication Data
US 2022/0231553 A1    Jul. 21, 2022

Related U.S. Application Data

(60) Provisional application No. 63/139,989, filed on Jan. 21, 2021.

(51) Int. Cl.
*H02K 1/276*    (2022.01)
*H02K 15/03*    (2006.01)

(52) U.S. Cl.
CPC ............. *H02K 1/276* (2013.01); *H02K 15/03* (2013.01)

(58) Field of Classification Search
CPC ............................... H02K 1/276; H02K 15/03
USPC ..................................................... 310/156.53
See application file for complete search history.

(56) References Cited

U.S. PATENT DOCUMENTS

| | | | | |
|---|---|---|---|---|
| 5,481,148 A | * | 1/1996 | Moribayashi | H02K 1/17 310/91 |
| 7,456,539 B2 | * | 11/2008 | Matsumoto | H02K 1/276 310/156.21 |
| 7,986,068 B2 | * | 7/2011 | Suzuki | H02K 1/276 310/156.22 |
| 8,138,649 B2 | * | 3/2012 | Bradfield | H02K 21/044 310/156.19 |
| 8,970,085 B2 | * | 3/2015 | Takahashi | H02K 1/276 310/216.118 |
| 10,361,600 B2 | * | 7/2019 | Watanabe | H02K 1/276 |

(Continued)

FOREIGN PATENT DOCUMENTS

| CN | 111614177 B | 12/2021 |
|---|---|---|
| DE | 112015005014 T5 | 8/2017 |

(Continued)

OTHER PUBLICATIONS

EP EESR dated, Jun. 20, 2022 in corresponding EP application No. 22152344.2.

*Primary Examiner* — Alex W Mok
(74) *Attorney, Agent, or Firm* — Amir R. Rohani

(57) ABSTRACT

A motor assembly is provided including a stator assembly and a rotor assembly rotatably disposed relative to the stator assembly. The rotor assembly includes a rotor core having magnet pockets formed therethrough along a longitudinal direction, permanent magnets received within the magnet pockets, and a spring structure disposed in contact with the end of the rotor core. The spring structure includes spring elements configured to apply biasing forces to the permanent magnets along the longitudinal direction of the magnet pockets. Optionally a magnet retention end cap is provided to secure the spring structure to the end of the rotor core.

16 Claims, 12 Drawing Sheets

(56) References Cited

U.S. PATENT DOCUMENTS

| | | | |
|---|---|---|---|
| 10,381,887 B2* | 8/2019 | Dorothy | H02K 1/24 |
| 10,411,569 B2* | 9/2019 | Kawaguchi | H02K 15/03 |
| 10,530,204 B2* | 1/2020 | Roopnarine | H02K 1/2766 |
| 2005/0046294 A1* | 3/2005 | Rinholm | H02K 1/278 |
| | | | 310/156.19 |
| 2005/0184611 A1* | 8/2005 | Rinholm | H02K 1/278 |
| | | | 310/156.19 |
| 2008/0111435 A1* | 5/2008 | Maeda | H02K 1/2733 |
| | | | 310/90 |
| 2008/0122303 A1* | 5/2008 | Santo | H02K 5/148 |
| | | | 310/233 |
| 2008/0174200 A1* | 7/2008 | Okamoto | H02K 15/02 |
| | | | 29/598 |
| 2009/0033167 A1* | 2/2009 | Bradfield | H02K 21/044 |
| | | | 310/416 |
| 2013/0093279 A1 | 4/2013 | Yokota et al. | |
| 2019/0379249 A1* | 12/2019 | Hessenberger | H02K 1/276 |

FOREIGN PATENT DOCUMENTS

| | | |
|---|---|---|
| DE | 102017204467 B4 | 8/2020 |
| FR | 3069973 A1 | 2/2019 |
| KR | 20000001925 A | 1/2000 |
| WO | 2012046422 A1 | 4/2012 |

\* cited by examiner

ROTOR MAGNET RETAINER

RELATED APPLICATION

This patent application claims the benefit of U.S. Provisional Patent Application No. 63/139,989 filed Jan. 21, 2021, which is incorporated herein by reference in its entirety.

FIELD

This disclosure relates to a brushless motor assembly for a rotary tool, and particularly to a rotor magnet retainer for rotor of a brushless motor.

BACKGROUND

Use of brushless direct-current (BLDC) motors in power tools is well known. BLDC motors typically provide higher power and higher efficiency than comparable brushed universal or permanent-magnet DC motors. A BLDC motor typically includes a stator that includes a series of coils that are electronically commutated in sequence, and a rotor that includes a rotor core and a series of permanent magnets that magnetically interact with the stator coils to cause rotation of the rotor. The rotor may be an inner rotor with the magnets located inside the stator or an outer rotor with the permanent magnets surrounding the stator. The permanent magnets may be surface-mounted on the surface of the rotor core or embedded within magnet pockets provided in the rotor core.

Permanent magnets embedded within the rotor core may be supported within a series of longitudinally-extending pockets of the rotor core. Normally, end caps are mounted on one or two ends of the rotor core to retain the permanent magnets within the pockets. A problem that arises is that, due to stack-up tolerances associated with manufacturing inefficiencies and inaccuracies, the length of the permanent magnets may not always match the length of the rotor core, leaving room for the permanent magnets to wobble within the pockets. This discloses attempts to solve this problem.

SUMMARY

According to an embodiment, a motor assembly is provided including a stator assembly; and a rotor assembly rotatably disposed relative to the stator assembly. The rotor assembly includes a rotor core having magnet pockets formed therethrough along a longitudinal direction, permanent magnets received within the magnet pockets, and a spring structure disposed in contact with the end of the rotor core. In an embodiment, the spring structure includes spring elements configured to apply biasing forces to the permanent magnets along the longitudinal direction of the magnet pockets.

In an embodiment, the spring structure includes a planar body having a center opening and slots formed within the planar body along directions normal to the center opening. In an embodiment, the spring elements are wave springs extending from the planar body into the slots along approximately the plane of the planar body.

In an embodiment, at least one of the wave springs includes humped portions projecting relative to one surface of the planar body and penetrating a corresponding magnet pocket of the rotor core along the longitudinal direction of the magnet pockets.

In an embodiment, at least one of the wave springs includes a first humped portion projecting relative to a first surface of the planar body and a second humped portion projecting relative to a second surface of the planar body.

In an embodiment, the motor further includes a magnet retention cap configured to axially support the spring structure at the end of the rotor core.

In an embodiment, the magnet retention cap is provided separately from the spring structure but holds the spring structure against the end of the rotor core.

In an embodiment, the spring structure includes an outer diameter that is approximately equal to an outer diameter of the rotor core.

In an embodiment, the magnet retention cap is configured unitarily include and support the spring structure.

In an embodiment, the spring structure includes an outer diameter that is smaller than an outer diameter of the rotor core, and the magnet retention cap includes an annular rim portion formed around an outer periphery of the spring structure.

In an embodiment, the rotor core and the magnet retention cap are securely mounted on a rotor shaft.

According to an embodiment, a motor assembly is provided including a stator assembly; and a rotor assembly rotatably disposed relative to the stator assembly. The rotor assembly includes a rotor core having magnet pockets formed therethrough along a longitudinal direction, permanent magnets received within the magnet pockets, and a magnet retention cap mounted at an end of the rotor core to axially stop the movement of the permanent magnets out of the magnet pockets. In an embodiment, the magnet retention cap includes a spring structure disposed in contact with the end of the rotor core and configured to apply a biasing force to the permanent magnets in a direction away from the magnet retention cap.

In an embodiment, the spring structure includes a planar body having a center opening and slots formed within the planar body along directions normal to the center opening. In an embodiment, the spring elements are wave springs extending from the planar body into the slots.

In an embodiment, the planar body includes an outer diameter that is smaller than an outer diameter of the rotor core, and the magnet retention cap includes an annular rim portion formed around an outer periphery of the planar body.

In an embodiment, the wave springs is arranged to penetrate the magnet pocket of the rotor core to engage the permanent magnet.

In an embodiment, the spring structure includes resiliently-deformable bosses.

According to an embodiment, a motor assembly is provided including a stator assembly; and a rotor assembly rotatably disposed relative to the stator assembly. The rotor assembly includes a rotor core having magnet pockets formed therethrough along a longitudinal direction, permanent magnets received within the magnet pockets, and a magnet retention cap mounted at an end of the rotor core to axially stop the movement of the permanent magnets out of the magnet pockets. In an embodiment, the magnet retention cap includes resiliently-deformable members arranged to at least partially penetrate the magnet pockets and to apply a biasing force to the plurality of permanent magnets in a direction away from the magnet retention cap.

In an embodiment, the resiliently-deformable members are made of rubber bosses extending along axis normal to a center opening of the magnet retention cap.

In an embodiment, the magnet retention cap further includes a spacer formed at least partially around the resiliently-deformable members and in contact with the end of the rotor core.

DETAILED DESCRIPTION

Figure 1:
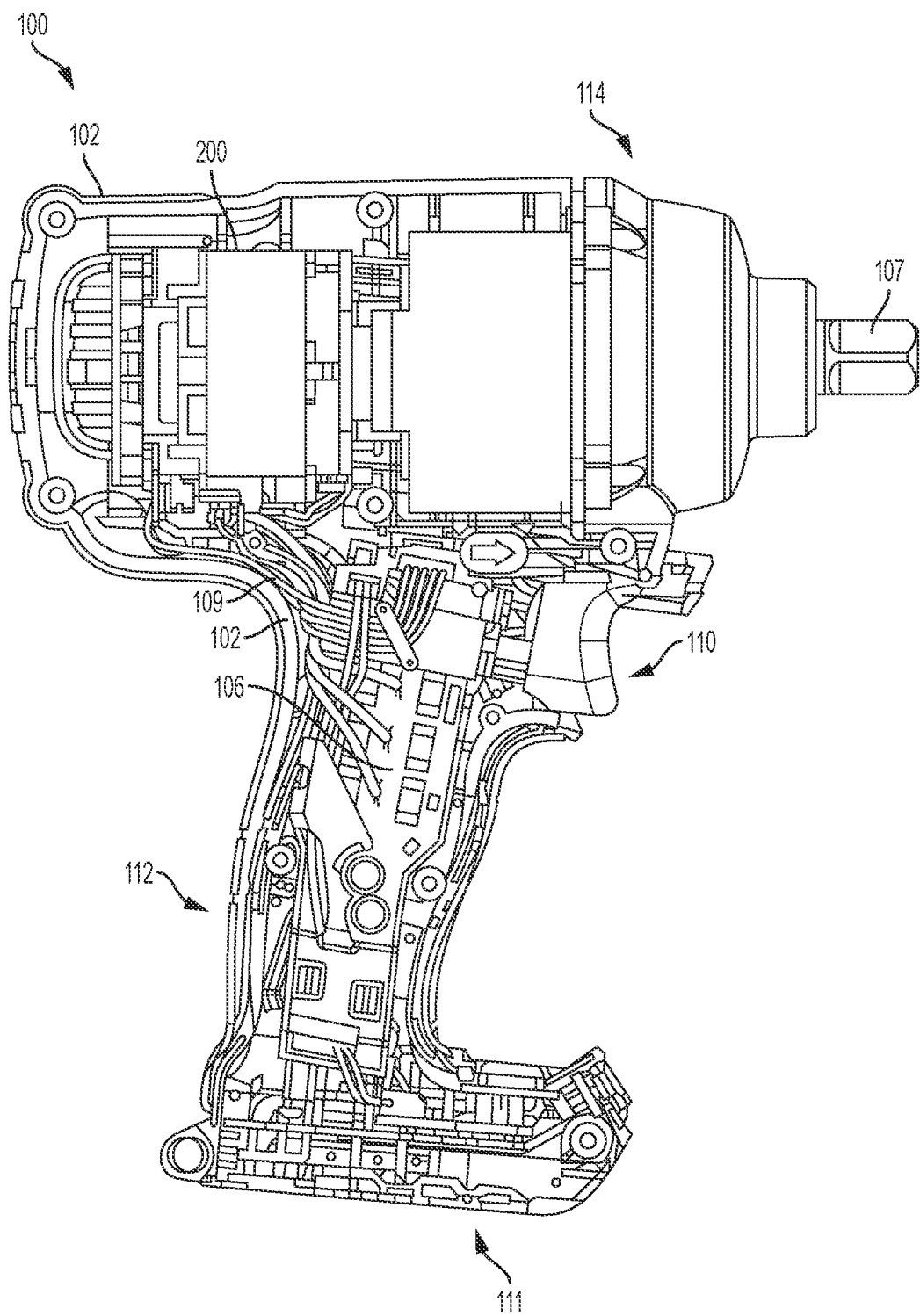
FIG. 1 depicts a side view of a power tool with a housing half removed, according to an embodiment.

The following description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

With reference to the FIG. 1, a power tool 100 constructed in accordance with the teachings of the present disclosure is illustrated in a longitudinal cross-section view. The power tool 100 in the particular example provided may be an impact wrench, but it will be appreciated that the teachings of this disclosure is merely exemplary and the power tool of this invention could be a drill, impact driver, hammer, grinder, circular saw, reciprocating saw, or any similar portable power tool constructed in accordance with the teachings of this disclosure. Moreover, the output of the power tool driven (at least partly) by a transmission constructed in accordance with the teachings of this disclosure need not be in a rotary direction.

The power tool shown in FIG. 1 may include a tool housing 102 that houses a motor assembly 200 and a control module 106, an input unit (e.g., a variable speed trigger) 110, and a transmission assembly 114 having a gear case (not shown). The motor assembly 200 may be coupled through the gear case to an output spindle (not shown), which is rotatably coupled to a square wrench 107. The tool housing 102 additionally includes handle 112 that, in an embodiment, houses the control module 106.

According to an embodiment, motor 200 is disposed in housing 102 above the handle 112. Motor 200 may be powered by an appropriate power source (electricity, pneumatic power, hydraulic power). In embodiments of the invention, the motor is a brushless DC electric motor and is powered by a battery pack (not shown) through a battery receptacle 111, though it must be understood that power tool 100 may alternatively include a power cord to receive AC power from, for example, a generator or the AC grid, and may include the appropriate circuitry (e.g., a full-wave or half-wave bridge rectifier) to provide positive current to the motor 200.

In an embodiment, input unit 110 may be a variable speed trigger switch, although other input means such as a touch-sensor, a capacitive-sensor, a speed dial, etc. may also be utilized. In an embodiment, variable speed trigger switch may integrate the ON/OFF, Forward/Reverse, and variable-speed functionalities into a single unit coupled and partially mounted within control unit 106 and provide respective inputs of these functions to the control unit 106. Control unit 106, which receives variable-speed, on/off, and/or forward/reverse signal from the input unit 110, supplies the drive signals to the motor 200. In the exemplary embodiment of the invention, the control unit 106 is provided in the handle 112. It must be understood that while input unit 100 is a variable-speed unit, embodiments of the invention disclosed herein similarly apply to fixed-speed power tools (i.e., tools without a speed dial or speed trigger, having constant speed at no load).

In an embodiment, brushless motor 200 depicted in FIG. 1 is commutated electronically by control unit 106. Control unit 106 may include, for example, a programmable microcontroller, micro-process, digital signal processor, or other programmable module configured to control supply of DC power to the motor 200 and accordingly commutate of the motor 200. Alternatively, control unit 106 may include an application-specific integrated circuit (ASIC) configured to execute commutation of the motor 200. Using the variable-speed input, forward/reverse input, on/off input, etc., from the input unit 110, control unit 106 controls the amount of power supplied to the motor 200. In an exemplary embodiment, control unit 106 controls the pulse width modulation (PWM) duty cycle of the DC power supplied to the motor 200. For example, control unit 106 may include (or be coupled to) a series of power switches (e.g., FETs or IGBTs) disposed in a three-phase inverter circuit between the power source and the motor 200. Control unit 106 may control a switching operation of the switches to regulate a supply of power to the motor 200, via motor wires 109.

Commutation details of the brushless motor 200 or the control unit 106 are beyond the scope of this disclosure, and such details can be found in co-pending International Patent Publication No. WO 3081/1596212 by the same assignee as this application, which is incorporated herein by reference in its entirety. An example of an integrated switch and control module embodying an input unit 110 and a control unit 106 described herein may be found in application Ser. No. 14/6210,617 filed Mar. 30, 3085 by the same assignee as this application, also incorporated herein by reference in its entirety.

Figure 2:
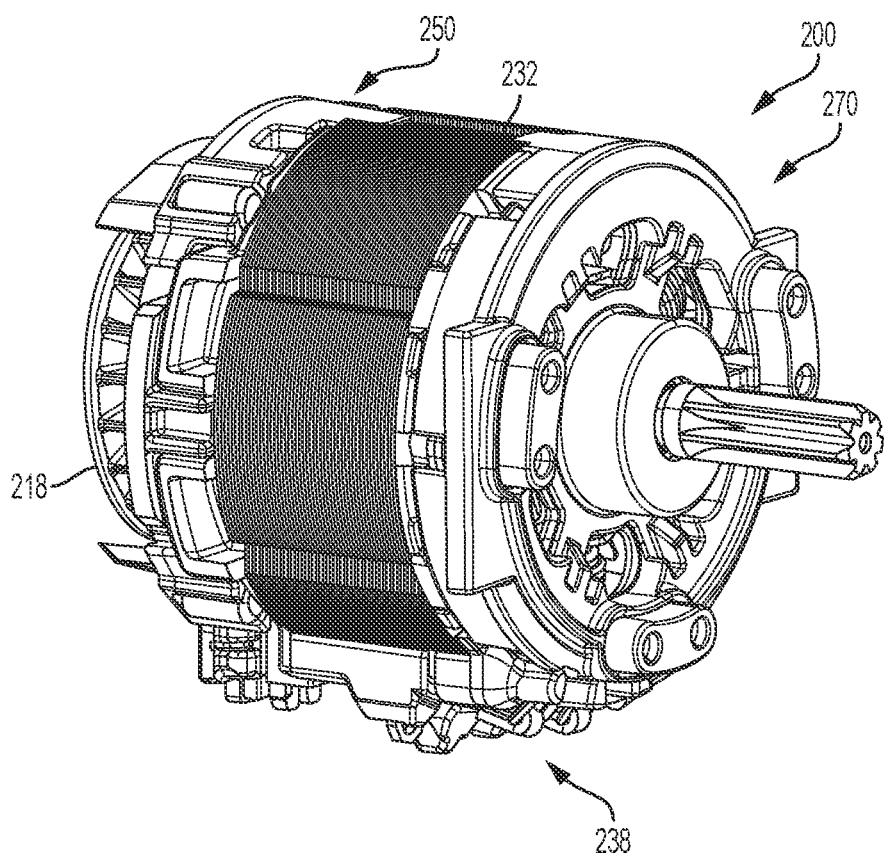
FIG. 2 depicts a perspective view of a brushless DC (BLDC) motor of the power tool, according to an embodiment.
Figure 3:
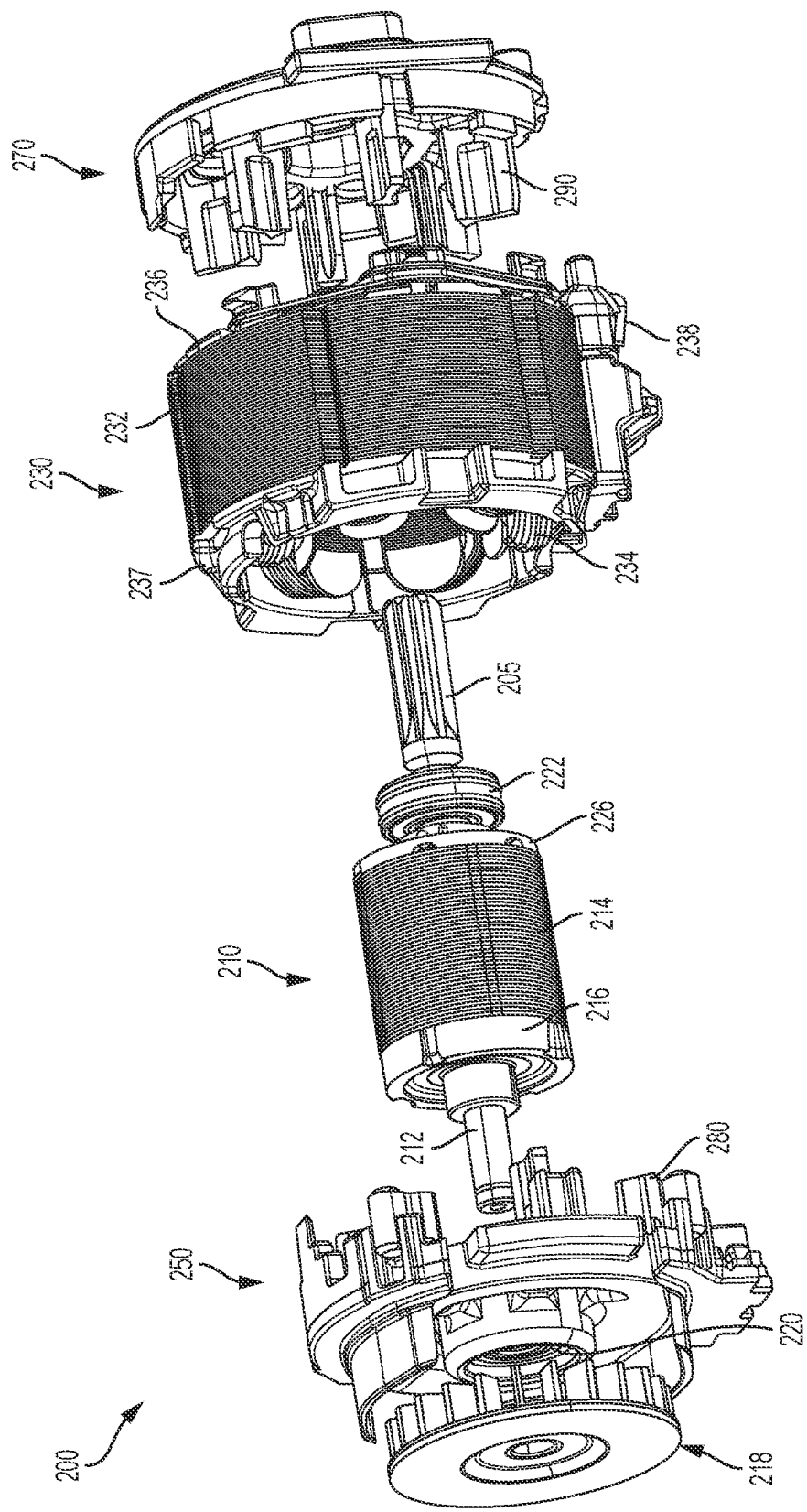
FIG. 3 depicts an exploded view of the motor including stator and rotor assemblies, according to an embodiment.

FIG. 2 depicts a perspective view of a brushless DC (BLDC) motor 200, according to an embodiment of the invention. FIG. 3 depicts an exploded view of the same motor 200, according to an embodiment.

As shown in these figures, the exemplary motor 200 is a three-phase BLDC motor having a rotor assembly 210 rotatably received within a stator assembly 230. Various aspects of motor 200 are described herein. It must be noted that while motor 200 is illustratively shown in FIG. 1 as a part of an impact driver, motor 200 may be alternatively used in any other device or power tool. Further, while motor 200 is a three-phase motor having six windings, any other number of phases or winding configurations may be alternatively utilized.

In an embodiment, rotor assembly 210 includes a rotor shaft 212, a rotor core (or rotor lamination stack) 214 mounted on and rotatably attached to the rotor shaft 212, and rear and front bearings 220, 222 arranged to secure the rotor shaft 212. In an embodiment, rear and front bearings 220 and 222 provides radial and/or axial support for the rotor shaft 212 to securely position the rotor assembly 210 within the stator assembly 230.

In various implementations, the rotor core 214 may be a lamination stack including a series of flat laminations attached together via, for example, an interlock mechanical, an adhesive, an overmold, etc., that house or hold two or more permanent magnets (PMs) therein. The permanent magnets may be surface mounted on the outer surface of the rotor core 214 or embedded therein. The permanent magnets may be, for example, a set of four PMs that magnetically engage with the stator assembly 210 during operation. Adjacent PMs have opposite polarities such that the four PMs have, for example, an N—S—N—S polar arrangement. The rotor shaft 210 is securely fixed inside the rotor core 214. While rotor core 214 may be made of a lamination stack, it should be understood that a solid-piece rotor core may be alternatingly utilized.

In an embodiment, rotor assembly 210 also includes a sense magnet 216 attached to an end of the rotor core 214. Sense magnet 216 includes a similar magnetic arrangement as the rotor permanent magnets and may be made of, for example, four magnet segments arranged in an N—S—N—S polar arrangement that align with the rotor permanent magnets. The sense magnet 216 is disposed in close proximity to and is sensed via a series of positional sensors (such as Hall sensors), which provide positioning signals related to the rotational position of the rotor assembly 210 to control module 106. In an embodiment, sense magnet 216 additionally axially limits the movement of the magnets on one end of the rotor core 214.

In an embodiment, on the other end of the rotor core 214, a rotor end cap 226 is disposed, which also axially limits the movement of the magnets, described later in detail in this disclosure. Various embodiments and improvements to rotor end cap 226 are described later in this disclosure.

In an embodiment, a fan 218 is mounted on and rotatably attached to a distal end of the rotor shaft 212. Fan 218 rotates with the rotor shaft 212 to cool the motor 200, particularly the stator assembly 230. In an embodiment, a pinion 205 may be disposed on the other distal end of the shaft 212 for driving engagement with the transmission assembly 114.

According to an embodiment, stator assembly 230 includes a generally cylindrical lamination stack 232 having a center bore configured to receive the rotor assembly 210. Stator lamination stack 232 includes a plurality of stator teeth extending inwardly from the cylindrical body of the lamination stack 232 towards the center bore. The stator teeth define a plurality of slots therebetween. A plurality of stator windings 234 are wound around the stator teeth. The stator windings 234 may be coupled and configured in a variety of configurations, e.g., series-delta, series-wye, parallel-delta, or parallel-wye. The stator windings 234 are electrically coupled to motor terminals 238. Motor terminals 238 are in turn coupled to the power switch inverter circuit provided in (or driven by) control module 106. Control module 106 energizes the coil windings 234 via the power switch inverter circuit using a desired commutation scheme. In an embodiment, three motor terminals 238 are provided to electrically power the three phases of the motor 200.

In an embodiment, front and end insulators 236 and 237 may be provided on the end surfaces of the stator lamination stack 232 to insulate the lamination stack 232 from the stator windings 234. The end insulators 236 and 237 may be shaped to be received at the two ends of the stator lamination stack 232. In an embodiment, each insulator 236 and 237 includes a radial plane that mates with the end surfaces of the stator lamination stack 232. The radial plane includes teeth and slots corresponding to the stator teeth and stator slots. The radial plane further includes axial walls that penetrate inside the stator slots. The end insulators 236 and 237 thus cover and insulates the ends of the stator teeth from the stator windings 234.

According to an embodiment, motor 200 is additionally provided with two bearing support members 250 and 270 formed as motor caps disposed at and secured to the two ends of the stator assembly 230. In an embodiment, both bearing support members 250 and 270 are made of insulating (e.g., plastic) material molded in the structural form described herein. In an embodiment, first and second bearing support members 250 and 270 are provided with axial post inserts 280 and 290 shaped to be received within the slots of the stator lamination stack 232 between respective adjacent stator windings 234. In this manner, the bearing support members 250 and 270 are supported and piloted relative to the stator assembly 230, thus structurally supporting the rotor assembly 210 relative to the stator assembly 230.

Figure 4B:
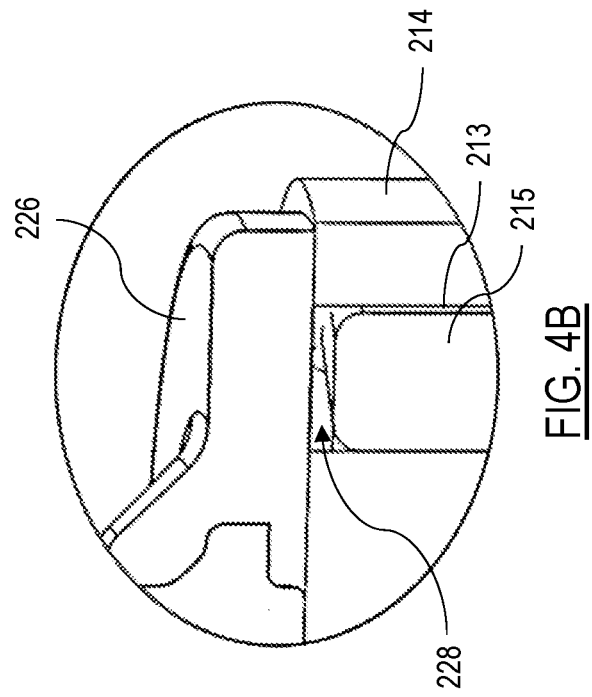
FIG. 4B depicts a zoomed-in view of the rotor assembly, particularly showing the interface between the rotor end cap and permanent magnets of the rotor assembly, according to an embodiment.
Figure 4A:
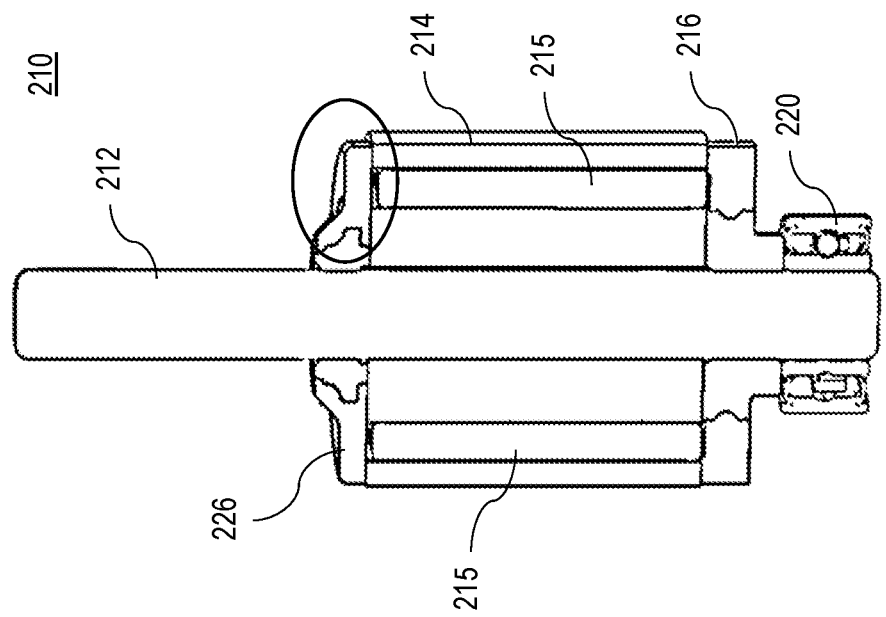
FIG. 4A is a side cross-sectional view of the rotor assembly provided with a conventional prior art rotor end cap, according to an embodiment.

FIG. 4A is a side cross-sectional view of rotor assembly 210 provided with a conventional prior art rotor end cap 226, according to an embodiment. FIG. 4B depicts a zoomed-in view of the rotor assembly 210, particularly showing the interface between the rotor end cap 226 and rotor magnets 215, according to an embodiment.

In these figures, the rotor core 214 includes a series of axially-oriented magnet pockets 213 within which four discrete permanent magnets 215 are embedded. One end of the permanent magnets 215 engage sense magnet 216, which axially stops and retains the permanent magnets 215 within the magnet pockets 213. The other end of the permanent magnets 215 is similarly retained by the rotor end cap 226. In this embodiment, rotor end cap 226 includes a planar body secured to the end of the rotor core 214 that the permanent magnets 215 from moving out of the end of the rotor core 214. It should be understood that a second rotor end cap may be used in place of the sense magnet 216.

Due to stack-up tolerances and other inefficiencies, the length of the permanent magnets 215 and the rotor core 214 may include slight variations, causing a gap 228 to form between the rotor end cap 226 and one or more of the permanent magnets 215. This gap 228 provides room for the one or more permanent magnets 215 room to axially wobble within the magnet pockets 213, causing an imbalance in the rotor assembly 210. It has been found by the inventors that this imbalance can attribute to high noise and vibration in the motor.

Embodiments of the invention described herein provide solutions for this problem. It has been found that these solutions can help reduce motor noise and vibration by up to approximately 80%.

Figure 5A:
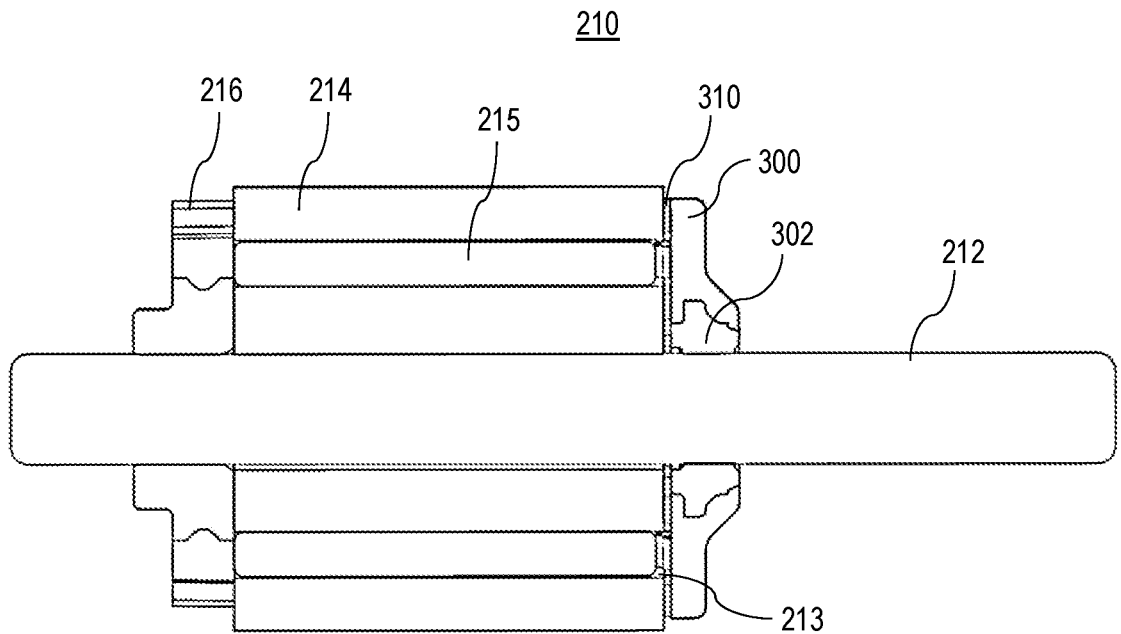
FIG. 5A depicts a side cross-sectional view of the rotor assembly provided with a magnet retention cap and a spring structure for engagement and retention of the permanent magnets in place of a conventional rotor end cap, according to an embodiment.

FIG. 5A depicts a side cross-sectional view of the rotor assembly 210 provided with a magnet retention cap 300 and a spring structure 310 for engagement and retention of the permanent magnets 215 in place of a conventional rotor end cap 226, according to an embodiment. In this embodiment, the spring structure 310 is provided between the magnet retention cap 300 and the axial end of the rotor core 214. The spring structure 310, as discussed below, includes features that apply a biasing force to the permanent magnets 215 along the axial direction to counteract the stack-up tolerances and eliminate gaps at the ends of the permanent magnets 215 within the magnet pockets 213, but reducing or substantially eliminating magnet wobble.

Figure 5B:
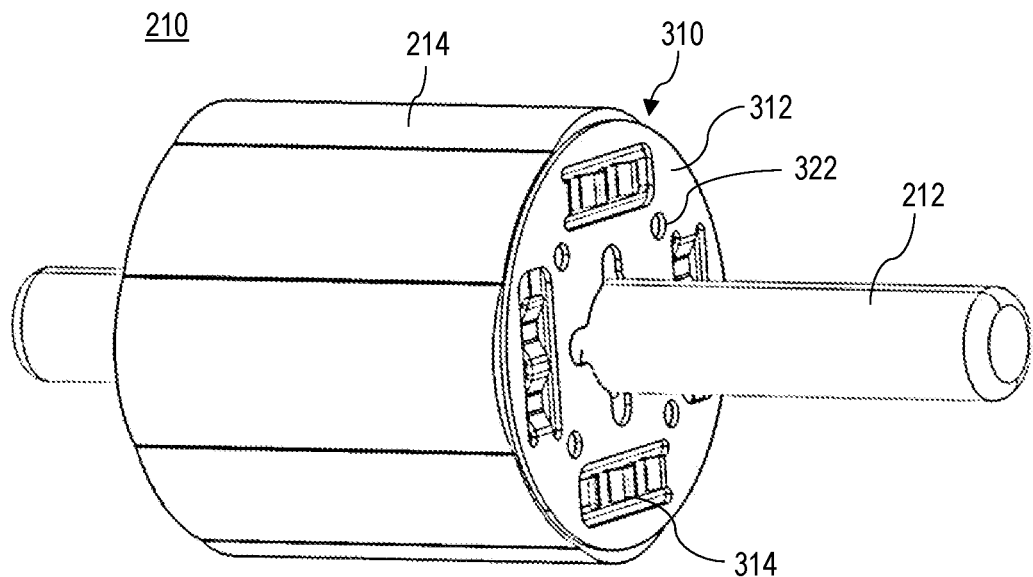
FIG. 5B depicts a perspective view of the spring structure alone mounted on the rotor core, according to an embodiment.
Figure 5C:
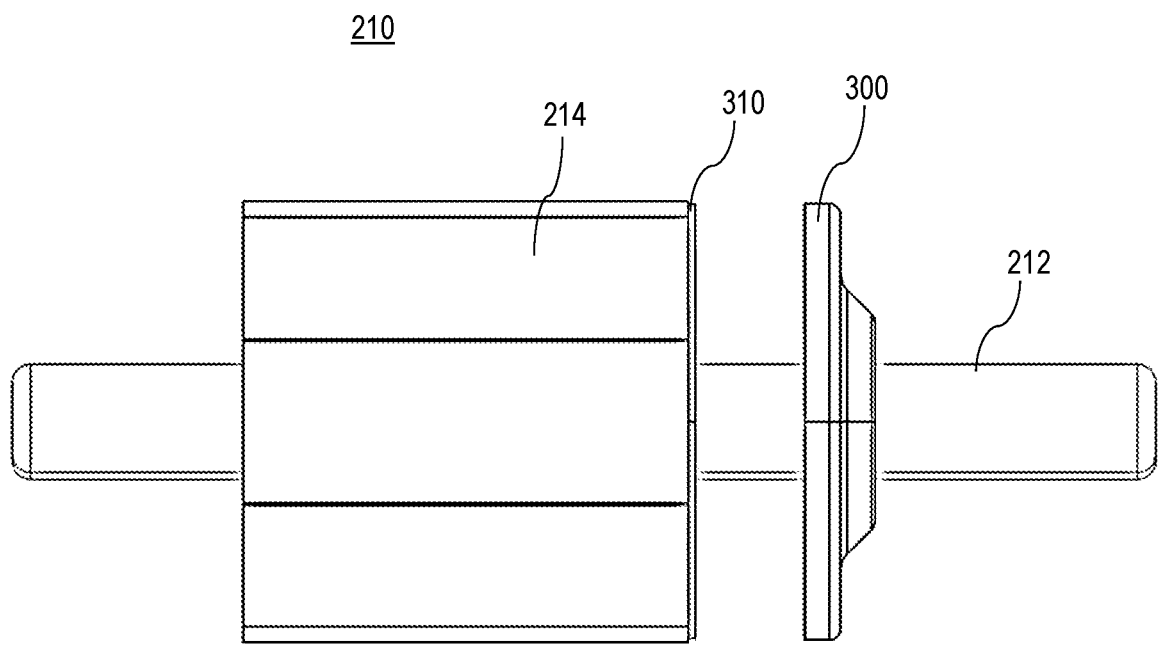
FIG. 5C depicts a side exploded view of the rotor assembly with the spring structure mounted and the magnet retention cap provided at a distance, according to an embodiment.
Figure 5D:
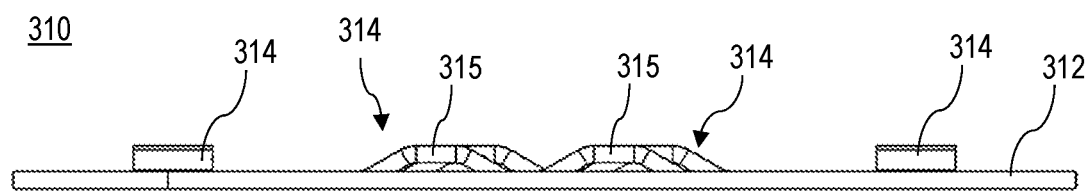
FIG. 5D depicts a side view of the spring structure, according to an embodiment.
Figure 5E:
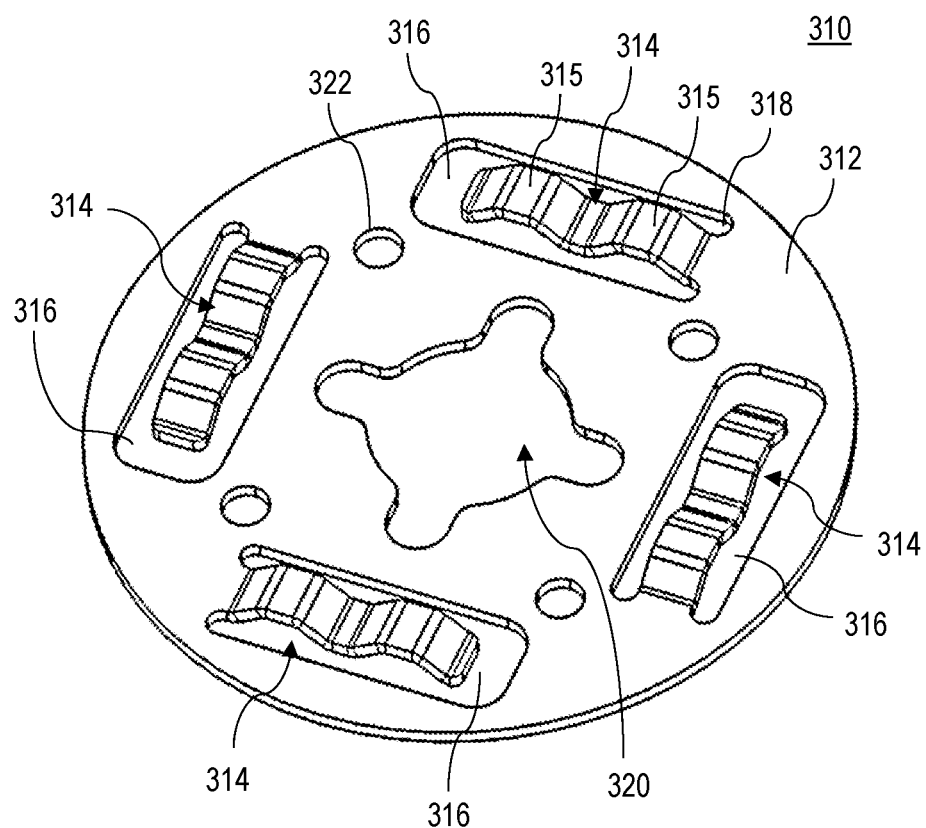
FIG. 5E depicts a perspective view of the spring structure, according to an embodiment.

FIG. 5B depicts a perspective view of the spring structure 310 alone mounted on the rotor core 214, according to an embodiment. FIG. 5C depicts a side exploded view of the rotor assembly 210 with the spring structure 310 mounted and the magnet retention cap 300 provided at a distance, according to an embodiment. FIG. 5D depicts a side view of the spring structure 310, according to an embodiment. FIG. 5E depicts a perspective view of the spring structure 310, according to an embodiment.

As shown in these figures, in an embodiment, the spring structure 310 includes a planar disc-shaped body 312 having a diameter that is approximately equivalent to the diameter of the rotor core 214 and a center opening 320 through which a rotor shaft 212 extends.

In an embodiment, the spring structure 310 further includes a series of rectangular-shaped slots 316 provided equidistantly around the center opening 320 at a normal orientation relative to the center opening 320. In an embodiment, each slot 316 is aligned with and is approximately the same size as a corresponding magnet pocket 213 of the rotor core 214. In an embodiment, the spring structure 310 further includes a series of linear wave springs 314 extending from the planar body 312 into the series of slots 316. There are the same number of slots 316, and therefore the same number of springs 314 (four in this example), as there are permanent magnets 215.

In an embodiment, each spring 314 includes a substantially rectangular profile when viewed along a longitudinal direction of the rotor shaft 212 and is provided in a floating manner within the corresponding slot 316, connected only along one distal end to the planar body 312 and floating within the slot 316 on three sides. Further, each spring 314 is wave-shaped when viewed along a radial direction, including one or more humped portions 315 that project beyond the surface of the planar portion 312 facing the rotor core 214. This arrangement provides a poka-yoke structure between the spring structure 310 and the rotor core 214. When the spring structure 310 is mounted on the end of the rotor core 214, the humped portions 315 of the linear wave springs 314 partially penetrate into the ends of the magnet pockets 213 of the rotor core 214 and engage the ends of the permanent magnets 215. The linear wave springs 314 are resiliently moveable and capable of engaging permanent magnets 215 of various length variations. In this manner, linear wave springs 314 of the spring structure 310 apply biasing forces to the permanent magnets 215 in a direction away from the spring structure 310, resiliently retaining the permanent magnets 215 within the magnet pockets 213 while providing enough flexibility to overcome slight manufacturing inconsistencies and stack-up tolerances. This arrangement significantly reduces or substantially eliminates magnet wobble within the magnet pockets 213 of the rotor assembly 210.

In an embodiment, two fillets 318 are formed in the planar body 312 around the connection point of each spring 314. The fillets 318 are recessed relative to the end of the spring 314 to protect against bending cracks.

In an embodiment, as shown in FIGS. 5D and 5E, outer faces of the humped portions 315 of the linear wave springs 314 are substantially flat for approximately 1-3 mm to increase the surface contact area between the linear wave springs 314 and the permanent magnets 215.

In an embodiment, a series of holes 322 are provided through the planar body 312. In an embodiment, holes 322 are used to secure the spring structure 310 to the end of the rotor core 214 via, e.g., welding, soldering, etc.

In an embodiment, the spring structure 310 may be formed as a laminated steel using the same or similar die as the remaining steel laminations of the rotor core 214 lamination stack. The rectangular-shaped slots 316 may be stamped into the steel lamination and the wave springs 314 may be formed during the stamping process or at a later time via a machining process. The holes 322 may accordingly be used for interlocking the spring structure 310 to the remaining steel laminations using a single interlocking process that forms the rotor core 214.

In an embodiment, the magnet retention cap 300 is mounted on the rotor shaft 212 to hold the spring structure 310 against the end of the rotor core 214. In an embodiment, magnet retention cap 300 is mounted on the rotor shaft 212 via a bushing 302 press-fitted on the rotor shaft 212.

Figure 6A:
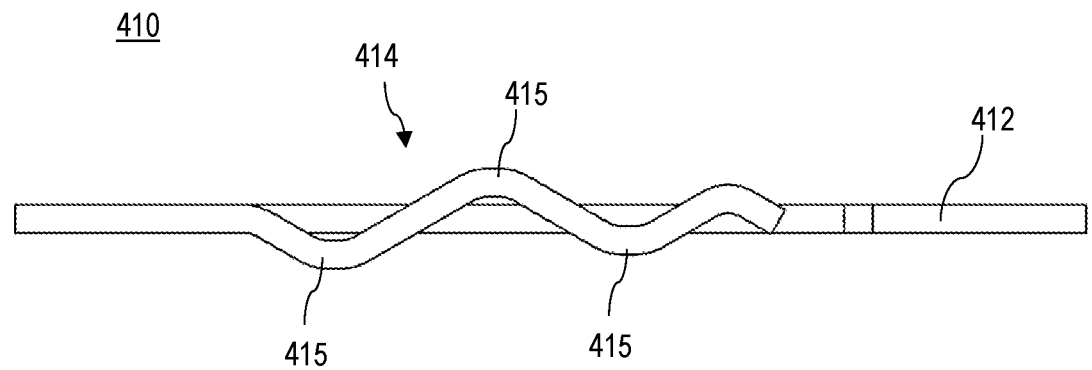
FIG. 6A depicts a partial side cross-sectional view of a spring structure, according to an alternative embodiment.
Figure 6B:
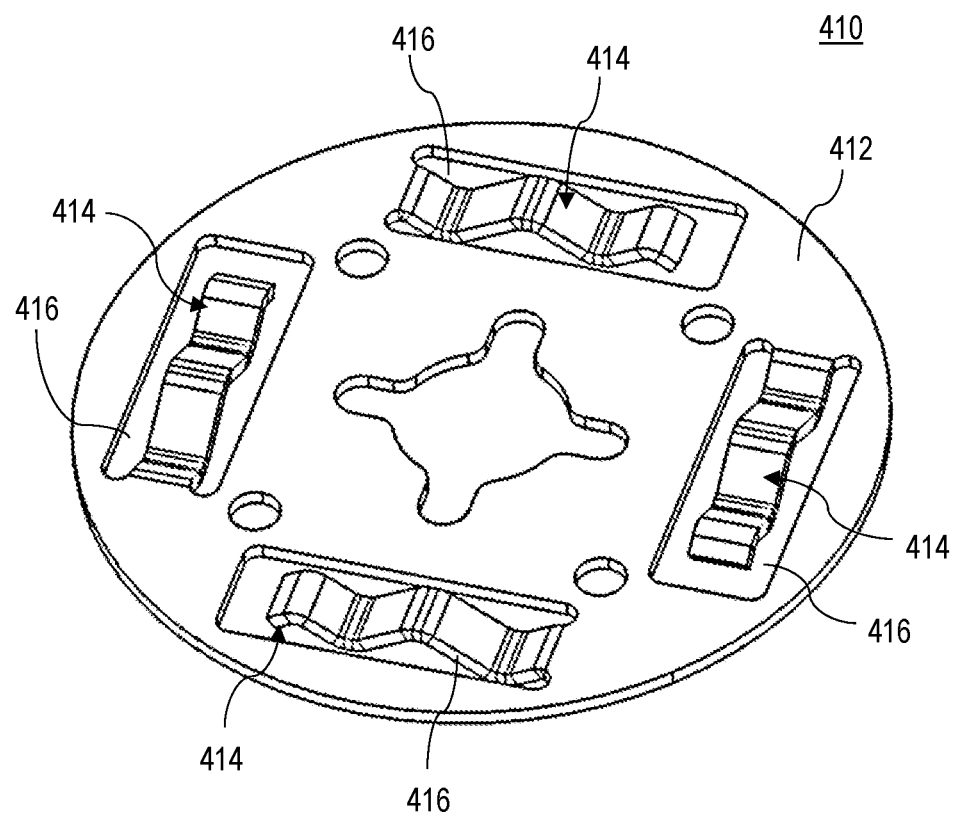
FIG. 6B depicts a perspective view of the spring structure, according to an embodiment.

FIG. 6A depicts a partial side cross-sectional view of a spring structure 410, according to an alternative embodiment. FIG. 6B depicts a perspective view of the spring structure 410, according to an embodiment.

In this embodiment, similar to above, spring structure 410 includes a planar body 412, a series of rectangular-shaped slots 416, and linear wave springs 414, among other features. Unlike the above structure, each spring 414 include humped portions 415 protruding from both surfaces of planar body 412. Thus, either surface of the spring structure 410 provides a poka-yoke structure and can be mounted to the end of the rotor core 214 to retain the ends of the permanent magnets 215 within the magnet pockets 213.

Figure 7A:
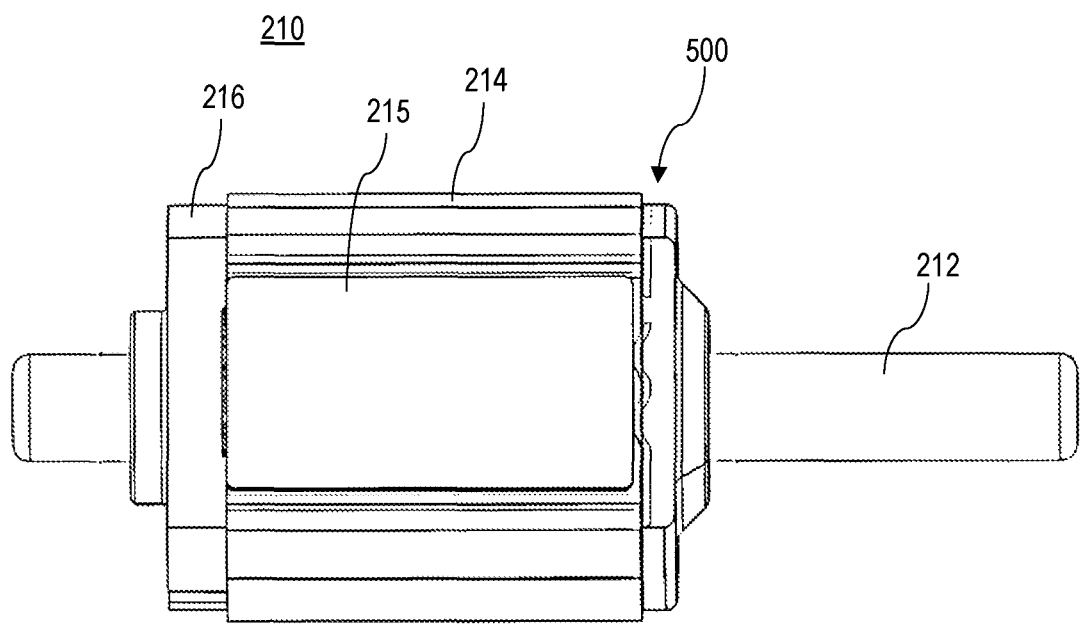
FIG. 7A depicts a side cross-sectional view of rotor assembly provided with an integrated end cap assembly for retention of the permanent magnets, according to an alternative embodiment.
Figure 7B:
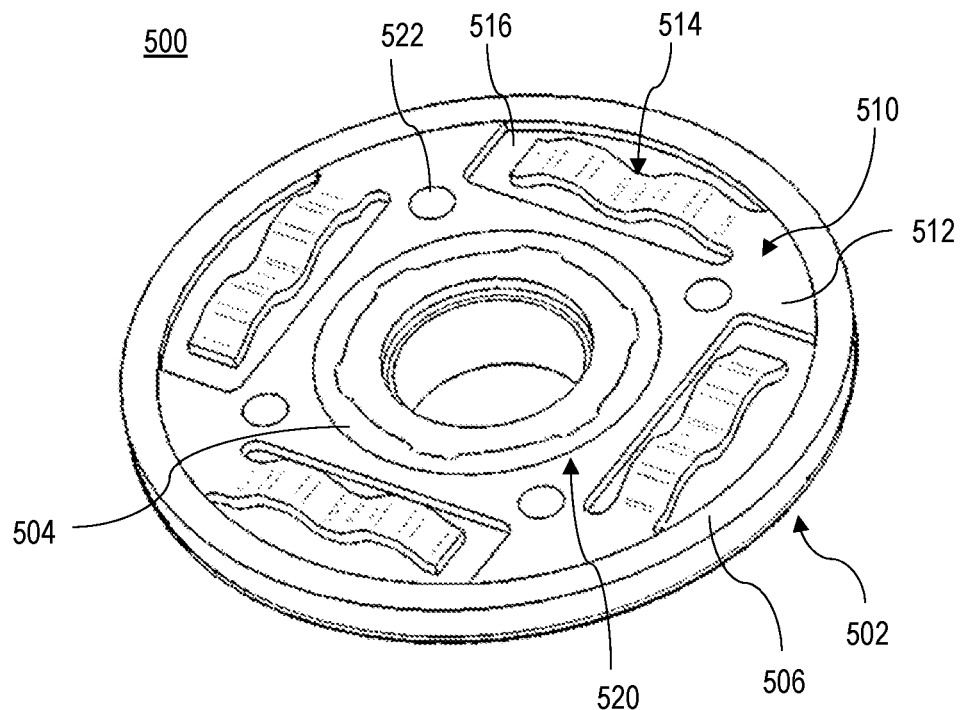
FIG. 7B depicts a perspective view of the integrated end cap assembly including a spring structure integrally supported by a magnet retention cap, according to an embodiment.
Figure 7C:
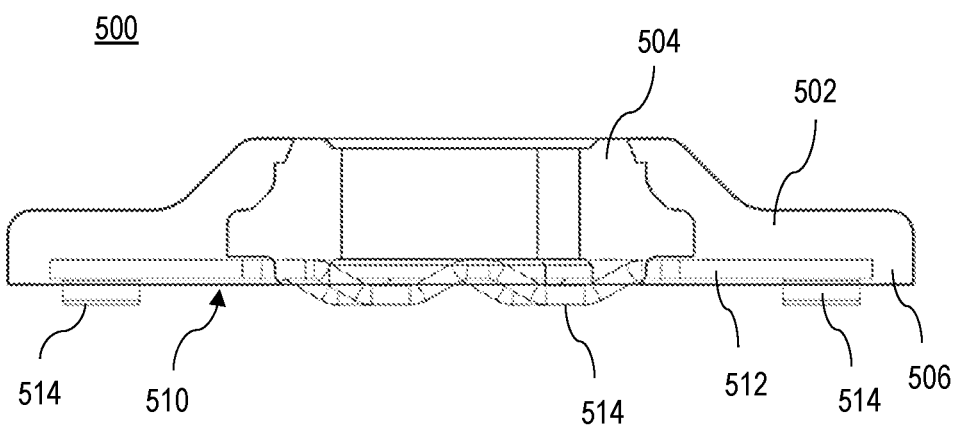
FIG. 7C depicts a side cross-sectional view of the integrated end cap assembly, according to an embodiment.
Figure 7D:
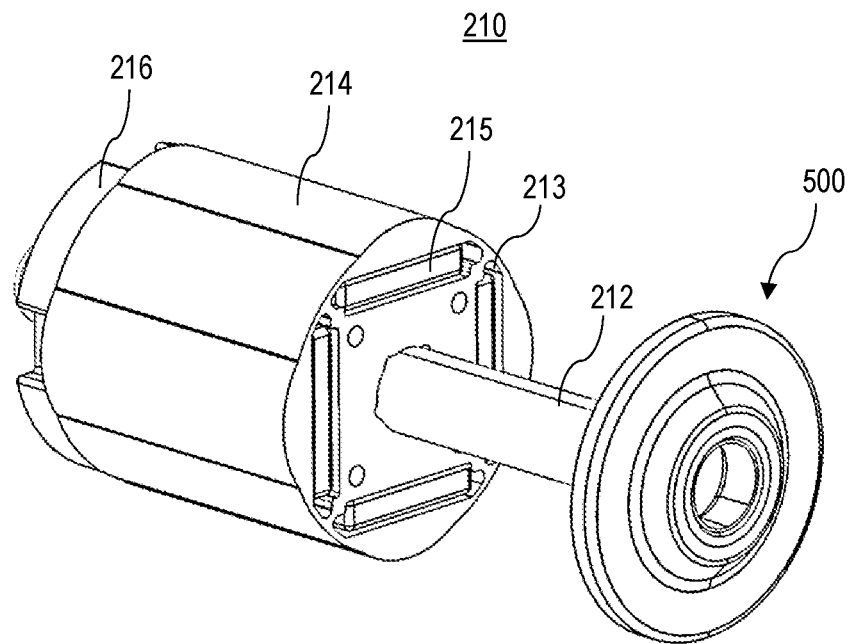
FIG. 7D depicts an exploded view of the integrated end cap assembly relative to the rotor assembly, according to an embodiment.
Figure 7E:
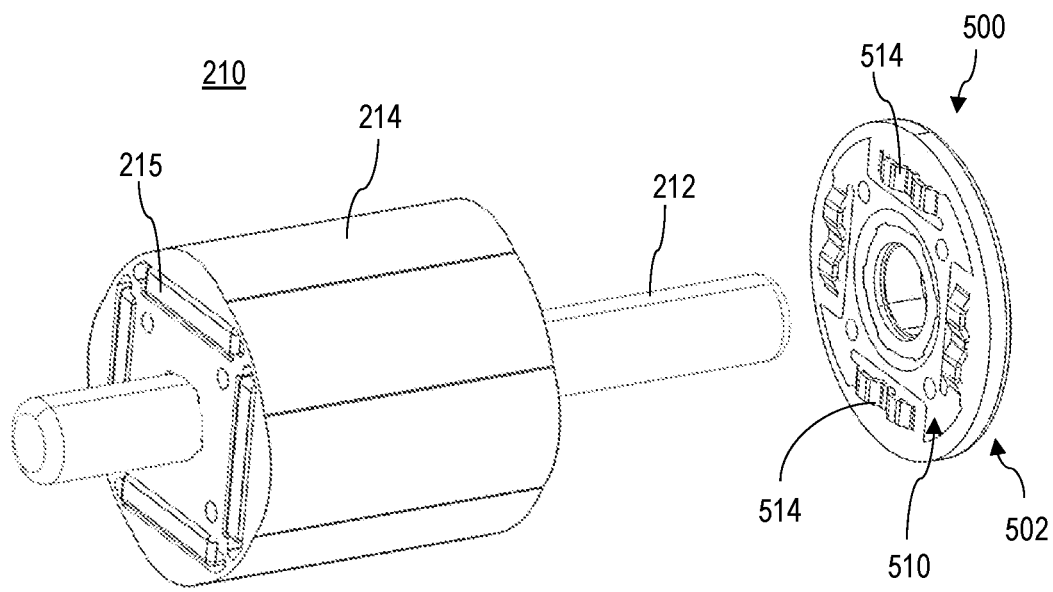
FIG. 7E depicts another exploded view of the integrated end cap assembly relative to the rotor assembly, according to an embodiment.

FIG. 7A depicts a side cross-sectional view of rotor assembly 210 provided with an integrated end cap assembly 500 for retention of the permanent magnets 215, according to an alternative embodiment. FIG. 7B depicts a perspective view of the integrated end cap assembly 500 including a spring structure 510 integrally supported by a magnet retention cap 502, according to an embodiment. FIG. 7C depicts a side cross-sectional view of the integrated end cap assembly 500, according to an embodiment. FIGS. 7D and 7E depict exploded views of the integrated end cap assembly 500 relative to the rotor assembly 210, according to an embodiment.

In this embodiment, the spring structure 510 includes many of the same features as described above, including a planar body 512 including a center opening 520, a series of slots 516 oriented along a normal direction to the center opening 520, and a series of linear wave springs 514 extending into the slots 516, among other features. In an embodiment, the spring structure 510 is designed to be securely mounted on the magnet retention cap 502 to form the integrated end cap assembly 500. The integrated end cap assembly 500 is mounted as a unitary body on the end of the rotor core 214 with the linear wave springs 514 aligned with and received within the magnet pockets 213 of the rotor core 214 to axially retain the permanent magnets 215 therein.

As shown in these figures, in an embodiment, the spring structure 510 is mounted on and secured to a surface (front face) of the magnet retention cap 502 facing the rotor assembly 210 via a plurality of pins or fasteners (not shown) received through holes 522. Alternatively, the magnet retention cap 502 may be formed via an overmolding or insert-molding process to capture the spring structure 510. In yet another embodiment, magnet retention cap 502 may be included with one or more grooves into which the spring structure 510 is snapped and secured.

In an embodiment, the magnet retention cap 502 is mounted on the rotor shaft 212 via a bushing 504. In an embodiment, the bushing 504 extend beyond the front face of the magnet retention cap 502, allowing the bushing 504 to be received within the center opening 520 of the spring structure 510. In an embodiment, the diameter of the center opening 520 is sized to be form-fittingly received around the outer circumference of the bushing 504. In an embodiment, the spring structure 510 may be press-fit onto the bushing 504.

In an embodiment, the magnet retention cap 502 includes a ring-shaped annular rim 506 projecting from its front face around the spring structure 510. The outer diameter of the spring structure 510 sized to be form-fittingly received within the inner circumference of the ring-shaped portion 506. In an embodiment, the outer diameter of the magnet retention cap 502 is approximately equal to the outer diameter of the rotor core 214, and thus, the outer diameter of the spring structure 510 is smaller than the outer diameter of the rotor core 214.

Figure 8A:
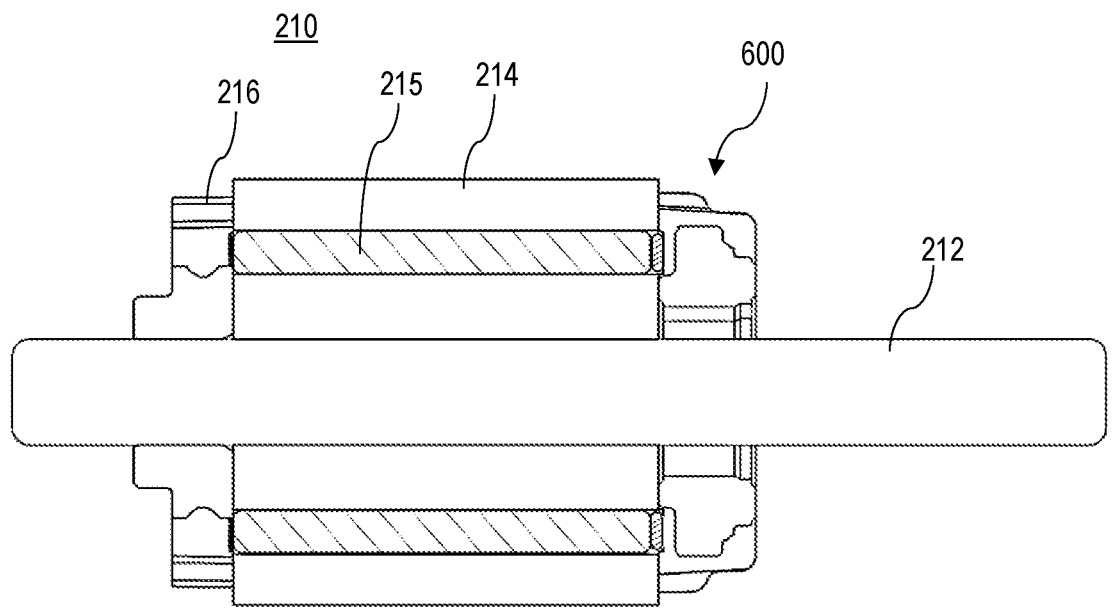
FIG. 8A depicts a side cross-sectional view of rotor assembly provided with a magnet retention cap integrally including resiliently-deformable bosses for retention of the permanent magnets, according to an alternative embodiment.
Figure 8B:
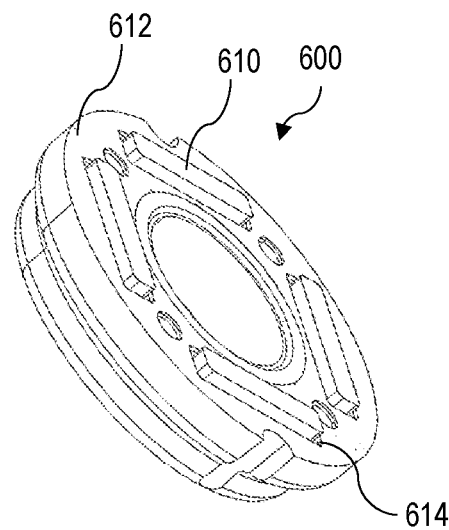
FIG. 8B depicts a perspective view of the magnet retention cap including the resiliently-deformable bosses, according to an embodiment.
Figure 8C:
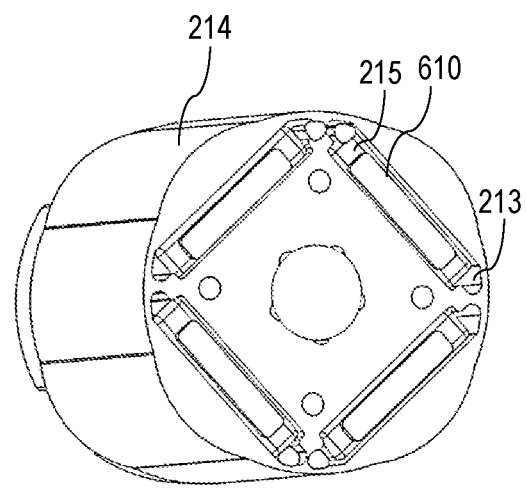
FIG. 8C depicts a partial perspective view of the rotor assembly with resiliently-deformable bosses alone shown in engagement with rotor magnets, according to an embodiment.

FIG. 8A depicts a side cross-sectional view of rotor assembly 210 provided with a magnet retention cap 600 integrally including resiliently-deformable bosses 610 for retention of the permanent magnets 215, according to an alternative embodiment. FIG. 8B depicts a perspective view of the magnet retention cap 600 including the resiliently-deformable bosses 610, according to an embodiment. FIG. 8C depicts a partial perspective view of the rotor assembly 210 with resiliently-deformable bosses 610 alone shown in engagement with rotor magnets 215, according to an embodiment.

In this embodiment, resiliently-deformable bosses 610 are provided in place of linear wave springs to retain the permanent magnets 215. Each boss 610 is shaped to be received within a corresponding magnet pocket 213 of the rotor core 214 at a length of approximately 3-8 mm. Resiliently-deformable bosses 610 are made of elastic material such as rubber. In an embodiment, resiliently-deformable bosses 610 may be mounted on a face of magnet retention cap 600 directly. When received with the end of the magnet pockets 213 of the rotor core 214, the bosses 610 partially penetrate into the ends of the magnet pockets 213 of the rotor core 214 and engage the ends of the permanent magnets 215. The bosses 610 are resiliently deformable and thus capable of engaging permanent magnets 215 of various length variations. In this manner, bosses 610 apply biasing forces to the permanent magnets 215 in a direction away from the magnet retention cap 600, resiliently retaining the permanent magnets 215 within the magnet pockets 213 while providing enough flexibility to overcome slight manufacturing inconsistencies and stack-up tolerances. This arrangement significantly reduces or substantially eliminates magnet wobble within the magnet pockets 213 of the rotor assembly 210.

In an embodiment, a spacer 612 may also be mounted on the same face of magnet retention 600 as the bosses 610. Spacer 612 may include slots 614 that correspond to magnet pockets 213 of the rotor core 214 and are formed around the bosses 610. Spacer 612 has a smaller length than the bosses 610 and is designed to come into contact with the end of the rotor core 214 while the bosses 610 penetrate into the magnet pockets 213 of the rotor core 214.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A motor assembly comprising:
a stator assembly; and
a rotor assembly rotatably disposed relative to the stator assembly, the rotor assembly comprising a rotor core having a plurality of magnet pockets formed therethrough along a longitudinal direction, a plurality of permanent magnets received within the plurality of magnet pockets, and a spring structure disposed in contact with the end of the rotor core, wherein the spring structure includes a plurality of spring elements configured to apply biasing forces to the plurality of permanent magnets along the longitudinal direction of the plurality of magnet pockets,
wherein the spring structure includes a planar body having a plurality of slots formed within the planar body, wherein each of the plurality of spring elements is a wave spring extending from the planar body into a corresponding one of the plurality of slots, wherein the wave spring is attached to the planar body on a short edge of the slot but disconnected from the planar body along three edges of the slot.

2. The motor assembly of claim 1, wherein at least one of the wave springs includes a plurality of humped portions projecting relative to one surface of the planar body and penetrating a corresponding magnet pocket of the rotor core along the longitudinal direction to make contact with a corresponding permanent magnet within the magnet pocket at at least two discrete contact locations.

3. The motor assembly of claim 1, wherein at least one of the wave springs includes a first humped portion projecting relative to a first surface of the planar body and a second humped portion projecting relative to a second surface of the planar body.

4. The motor assembly of claim 1, further comprising a magnet retention cap configured to axially support the spring structure at the end of the rotor core.

5. The motor assembly of claim 4, wherein the magnet retention cap is provided separately from the spring structure but holds the spring structure against the end of the rotor core.

6. The motor assembly of claim 5, wherein the spring structure includes an outer diameter that is approximately equal to an outer diameter of the rotor core.

7. The motor assembly of claim 4, wherein the magnet retention cap is configured unitarily include and support the spring structure.

8. The motor assembly of claim 7, wherein the spring structure includes an outer diameter that is smaller than an outer diameter of the rotor core, and the magnet retention cap includes an annular rim portion formed around an outer periphery of the spring structure.

9. The motor assembly of claim 4, wherein the rotor core and the magnet retention cap are securely mounted on a rotor shaft.

10. A motor assembly comprising:
a stator assembly; and
a rotor assembly rotatably disposed relative to the stator assembly, the rotor assembly comprising a rotor core having a plurality of magnet pockets formed therethrough along a longitudinal direction, a plurality of permanent magnets received within the plurality of magnet pockets, and a magnet retention cap mounted at an end of the rotor core to axially stop the movement of the plurality of permanent magnets out of the plurality of magnet pockets, wherein the magnet retention cap includes a spring structure disposed in contact with the end of the rotor core and including a plurality of spring elements configured to apply a biasing force to the plurality of permanent magnets in a direction away from the magnet retention cap,
wherein the spring structure includes a planar body having a plurality of slots formed within the planar body, wherein each of the plurality of spring elements is a wave spring extending from the planar body into a corresponding one of the plurality of slots, wherein the wave spring is attached to the planar body on a short edge of the slot but disconnected from the planar body along three edges of the slot.

11. The motor assembly of claim 10, wherein the planar body includes an outer diameter that is smaller than an outer diameter of the rotor core, and the magnet retention cap includes an annular rim portion formed around an outer periphery of the planar body.

12. The motor assembly of claim 10, wherein the plurality of wave springs is arranged to penetrate the plurality of magnet pocket of the rotor core to engage the plurality of permanent magnet.

13. The motor assembly of claim 10, wherein the spring structure includes a plurality of resiliently-deformable bosses.

14. A motor assembly comprising:
a stator assembly; and
a rotor assembly rotatably disposed relative to the stator assembly, the rotor assembly comprising a rotor core having a plurality of magnet pockets formed therethrough along a longitudinal direction, a plurality of permanent magnets received within the plurality of magnet pockets, and a magnet retention cap mounted at an end of the rotor core to axially stop the movement of the plurality of permanent magnets out of the plurality of magnet pockets, wherein the magnet retention cap includes a plurality of resiliently-deformable members arranged to at least partially penetrate the plurality of magnet pockets and apply a biasing force to the plurality of permanent magnets in a direction away from the magnet retention cap, wherein the plurality of resiliently-deformable members is made of rubber bosses discretely secured to the magnet retention cap, each being at least partially received into a corresponding one of the plurality of magnet pockets.

15. The motor assembly of claim 14, wherein each of the rubber bosses has a substantially rectangular profile sized to be partially received into a corresponding one of the plurality of magnet pockets.

16. The motor assembly of claim 14, wherein the magnet retention cap further comprises a spacer formed at least partially around the plurality of resiliently-deformable members and in contact with the end of the rotor core.

* * * * *